United States Patent
Randall et al.

(10) Patent No.: US 11,566,103 B2
(45) Date of Patent: Jan. 31, 2023

(54) HYPERBRANCHED POLYLACTIDE RESIN COMPOSITIONS

(71) Applicant: NatureWorks LLC, Minnetonka, MN (US)

(72) Inventors: Jed Richard Randall, Minneapolis, MN (US); Aman Kulshrestha, Minnetonka, MN (US); Nemat Hossieny, Medina, MN (US)

(73) Assignee: Nature Works LLC, Plymouth, MN (US)

( * ) Notice: Subject to any disclaimer, the term of this patent is extended or adjusted under 35 U.S.C. 154(b) by 255 days.

(21) Appl. No.: 16/960,035

(22) PCT Filed: Jan. 25, 2019

(86) PCT No.: PCT/US2019/015058
§ 371 (c)(1),
(2) Date: Jul. 3, 2020

(87) PCT Pub. No.: WO2019/152264
PCT Pub. Date: Aug. 8, 2019

(65) Prior Publication Data

US 2020/0362102 A1 Nov. 19, 2020

Related U.S. Application Data

(60) Provisional application No. 62/625,440, filed on Feb. 2, 2018.

(51) Int. Cl.
*C08G 63/82* (2006.01)

(52) U.S. Cl.
CPC .................................. *C08G 63/823* (2013.01)

(58) Field of Classification Search
CPC ..... C08G 63/823; C08G 63/912; C08G 63/08; C08L 67/04; C08K 5/159
See application file for complete search history.

(56) References Cited

U.S. PATENT DOCUMENTS

| | | | | |
|---|---|---|---|---|
| 5,594,095 | A * | 1/1997 | Gruber | C08G 63/08 525/413 |
| 5,798,435 | A | 8/1998 | Gruber | |
| 8,334,348 | B2 | 12/2012 | Hogt | |
| 8,981,002 | B2 | 3/2015 | Cernohous | |
| 9,527,967 | B2 | 12/2016 | Iacobucci | |
| 2009/0124723 | A1* | 5/2009 | Hogt | C08G 63/08 523/124 |
| 2012/0101198 | A1* | 4/2012 | Cernohous | C08L 101/005 264/312 |

FOREIGN PATENT DOCUMENTS

| | | |
|---|---|---|
| JP | 2015-083651 A | 4/2015 |
| WO | 2013-116763 | 8/2013 |

OTHER PUBLICATIONS

Yang et al.; Polymer Testing, 2008, vol. 27, p. 957-963.*
Yang et al., Polymer Testing 27 (2008) 957-963.

* cited by examiner

*Primary Examiner* — Robert S Jones, Jr.

(57) ABSTRACT

Polylactide resins are branched by reaction with a mixture of a polyene compound and a cyclic peroxide. This branching method produces a product that has a very high polydispersity, a high branching number ($B_n$) and excellent melt strength, without forming large amounts of gelled material. The branched polylactide resins are useful in many melt processing operations, in particular sheet and film extrusion, extrusion foaming, extrusion coating and fiber processing. They are characterized by easy processing and allow for broadened processing windows.

4 Claims, No Drawings

HYPERBRANCHED POLYLACTIDE RESIN COMPOSITIONS

This invention relates to highly branched polylactide compositions.

Polylactide resins are thermoplastics that is converted into a variety of end-use products. The penetration of polylactide resins into certain applications has been held back due to difficulties in melt-processing the material. Polylactide resins tend to have narrow processing windows and low melt strengths.

Melt strength can be increased by branching the polylactide resin. Various branching methods have been described before. These include, for example, copolymerizing lactide with an epoxidized fat or oil, as described in U.S. Pat. No. 5,359,206 or with a bicyclic lactone comonomer as described in WO 2002/100921A. Polyfunctional initiators have been used in lactide polymerization processes, as described in U.S. Pat. Nos. 5,210,108 and 5,225,521, GB 2277324 and EP 632 081. Epoxy-functional acrylate polymers have been used to branch polylactide resins, as described in WO 2006/002372. None of these approaches has proved to be entirely adequate, for various reasons. In some cases, melt strength is not increased sufficiently. In others, adequate melt strength is obtained but the resin viscosity increases to unworkable levels, or the ability to draw the material suffers.

Polylactide resins have been treated with linear peroxides, as described in U.S. Pat. Nos. 5,594,095 and 5,798,435. This branching reaction is difficult to control and produces a substantial quantity of crosslinked gels. These gels create various problems when the polylactide is melt-processed. They form defects in the resulting parts, clog orifices in the production equipment and deposit onto equipment surfaces.

More recently, certain cyclic peroxides have been evaluated for branching polylactide resins. As shown in U.S. Pat. No. 8,334,348, these cyclic peroxides are very inefficient branching agents. Only small increases in weight average molecular weight ($M_w$) are obtained. Little gelling is seen only because of the poor efficiency of the branching reaction.

Yang et al. in "Thermal and Mechanical Properties of Chemical Crosslinked Polylactide (PLA)", Polymer Testing 27 (2008) 957-963, describe the combined use of triallyl isocyanurate (TAIC) and dicumyl peroxide to crosslink polylactide. This produces a "highly crosslinked structure" associated with an increased brittleness that the authors identified as a "problem needing to be overcome". As shown in their FIG. 2, gel fractions of 20% or more are obtained even at very low levels of TAIC and the peroxide. These highly gelled compositions are unsuitable for use in melt processing operations.

The invention is in one aspect a method for making a branched polylactide composition, comprising the steps of
  I. forming a molten mixture of:
  i) a starting linear polylactide resin or mixture of linear polylactide resins;
  ii) 0.05 to 1.5 weight percent, based on the weight of component i), of at least one polyene compound, the polyene compound having 2 to 6 vinyl groups and an equivalent weight per vinyl group of up to 500; and
  iii) 0.001 to 0.2 weight percent, based on the weight of component i), of at least one cyclic peroxide; and
  II. reacting the molten mixture at a temperature sufficient to decompose component iii) and branch at least a portion of the linear polylactide resins.

This method provides a high degree of long-chain branching, as indicated by large increases in number average molecular weight ($M_w$), Z-average molecular weight, polydispersity ($M_w/M_n$) and branching number ($B_n$), and a decreased in Mark-Houwink slope, compared to linear polylactide resins. The branched molecules may include hyperbranched species in which multiple long-chain branch points are present. Surprisingly, only a small amount of gelled material is formed.

The invention is also a branched polylactide composition made in accordance with the foregoing method. The branched polylactide composition exhibits greatly increased melt strength compared to the starting linear polylactide. Unlike other polylactides that have comparable melt strengths, their melt viscosities are not increased greatly from those of the starting linear polylactides. This combination of low melt viscosity and high melt strength allows for wider processing windows.

The branched polylactide composition may be used by itself in a melt-processing operation. However, it is often convenient to dilute the branched polylactide by melt-blending it with another polymer, in particular another linear polylactide resin, to form a let-down composition that is melt-processed. The let-down compositions exhibit the desired attributes of low melt viscosity and increased melt strength.

Component i) is a linear polylactide resin. For the purposes of this invention, the terms a "polylactide resin" is a polymer of lactide having repeating units of the structure —OC(=O)CH(CH$_3$)— ("lactic units"). The polylactide resin contains at least 90% by weight of such lactic units, and preferably contains at least 95% or at least 98% by weight of lactic units. By "linear" it is meant that the polylactide resin contains no branches that have 6 or more carbon atoms. Side-chains or pendant groups having fewer than 6 carbon atoms (including pendant methyl groups on each lactic unit of the polylactide resin) are not considered as "branches" for purposes of this invention and are not counted toward the branching number $B_n$.

The polylactide resin may contain minor amounts, such as up to 10%, preferably up to 5% and more preferably up to 2% by weight, of residues of an initiator compound and/or repeating units derived from other monomers that are copolymerizable with lactide. Suitable such initiators include difunctional compounds such as water, alcohols, glycol ethers, and polyhydroxy compounds of various types (such as ethylene glycol, propylene glycol, polyethylene glycol, polypropylene glycol, and the like). Examples of copolymerizable monomers include glycolic acid, 2-hydroxybutyric acid and other α-hydroxyacids which can condense with lactic acid and generate cyclic diester impurities in lactide; alkylene oxides (including ethylene oxide, propylene oxide, butylene oxide, tetramethylene oxide, and the like); cyclic lactones; or cyclic carbonates. The polylactide resin(s) most preferably essentially devoid of such repeating units derived from other monomers.

The polylactide resins(s) can be prepared by polymerizing lactide in the presence of a polymerization catalyst as described in, for example, U.S. Pat. Nos. 5,247,059, 5,258, 488 and 5,274,073. This preferred polymerization process typically includes a devolatilization step during which the free lactide content of the polymer is reduced, preferably to less than 1% by weight, more preferably less than 0.5% by weight or less than 0.3% by weight, and especially less than 0.2% by weight. The polymerization catalyst is preferably deactivated or removed from the polylactide resin.

The polylactide resin or mixture of polylactide resin(s) may have a relative viscosity of 2.0 to 4.5. Relative viscosity is the ratio of the viscosity of a 1% wt/vol solution of the polylactide resin in chloroform to that of a chloroform standard, as measured using a capillary viscometer at 30° C.

Lactic units contain a chiral carbon atom and therefore exist in two enantiomeric forms, the "L" (or "S") enantiomer and the "D" (or "R") enantiomer. The ratio of L-lactic repeating units to D-lactic repeating units in the linear polylactide resin or mixture of polylactide resins present in the polyester blend of the invention may be from 100:0 to 0:100, and is in general selected in each case to provide properties suitable for the particular end-use product for which it will be used. In some embodiments, this ratio is >1:99 and <99:1, >2:98 and <98:2, >4:96 and <96:4, >8:92 and <92:8, >10:90 and <90:10 or >12:88 and <88:12.

The polylactide resin(s) may include virgin materials and/or recycled post-industrial or post-consumer polylactide resin(s).

The starting linear polylactide resin or mixture of linear polylactide resins has a relative viscosity of 2 to 4.5. The relative viscosity is preferably at least 2.5 or at least 2.75 and is preferably up to 4, up to 3.75 or up to 3.5. Relative viscosity is the ratio of the viscosity of a 1% wt/vol solution of the polylactide resin in chloroform to that of a chloroform standard, as measured using a capillary viscometer at 30° C.

The linear polylactide resin(s) may have hydroxyl end groups, carboxyl end groups or both hydroxyl and carboxyl end groups. In some embodiments, at least a portion of the linear polylactide resin molecules have one hydroxyl and one carboxyl end group. In some embodiments, at least a portion of the linear polylactide resin molecules have two carboxyl end groups and no hydroxyl end groups.

The polyene compound(s) contain 2 to 6 vinyl group per molecule. A "vinyl" group for purposes of this invention is a —CHR=CHR group, where each R is independently hydrogen or linear, branched or cyclic alkyl having up to 6 carbon atoms, or phenyl. The vinyl groups preferably are allylic, i.e., part of a larger group having the form —CH$_2$—CHR=CHR, and/or are enones i.e., part of a larger group having the form —C(O)—CHR=CHR. R is preferably hydrogen in each case.

In some embodiments, the polyene compound(s) each (if more than one) contains 2 to 4 vinyl groups per molecule and in particular embodiments contains 2 or 3 vinyl group per molecule.

Each polyene compound may have an equivalent weight per vinyl group of up to 500. This equivalent weight may be at least 50, at least 70 or at least 90 and up to 400, up to 300 or up to 250.

Examples of suitable polyene compounds include, for example, various compounds corresponding to esters of acrylic acid and a polyol. These include, for example, 1,4-butanediol diacrylate, 1,5-pentanediol diacrylate, 1,6-hexanediol diacrylate, neopentyl glycol diacrylate, diethylene glycol diacrylate, triethylene glycol diacrylate, tetraethylene glycol diacrylate, polyethylene glycol diacrylate, dipropylene glycol diacrylate, tripropylene glycol diacrylate, cyclohexane dimethanol diacrylate, alkoxylated hexanediol diacrylate, neopentyl glycol diacrylate, propoxylated neopentyl glycol diacrylate, trimethylolpropane triacrylate, ethoxylated trimethylolpropane triacrylate, propoxylated trimethylolpropane triacrylate, glycerine triacrylate, ethyloxylated and/or propoxylated glycerine triacrylate, pentaerythritol di-, tri- or tetraacrylate, erythritol di-, tri- or tetraacrylate, acrylated polyester oligomer, bisphenol A diacrylate, acrylated bisphenol A diglycidylether, ethyoxylated bisphenol A diacrylate, and the like. Other suitable acrylate compounds include tris(2-hydroxyethyl) isocyanurate triacrylate and acrylated urethane oligomers.

Other suitable polyene compounds are compounds having two or more allylic groups. Examples of these include polyallyl ethers of a polyol and polyallyl esters of a polycarboxylic acid.

Suitable polyallyl ethers include, for example, 1,4-butanediol diallyl ether, 1,5-pentanediol diallyl ether, 1,6-hexanediol diallyl ether, neopentyl glycol diallyl ether, diethylene glycol diallyl ether, triethylene glycol diallyl ether, tetraethylene glycol diallyl ether, polyethylene glycol diallyl ether, dipropylene glycol diallyl ether, tripropylene glycol diallyl ether, cyclohexane dimethanol diallyl ether, alkoxylated hexanediol diallyl ether, neopentyl glycol diallyl ether, propoxylated neopentyl glycol diallyl ether, trimethylolpropane di- or triallyl ether, ethoxylated trimethylolpropane di- or triallyl ether, propoxylated trimethylolpropane di- or triallyl ether, glycerine di- or triallyl ether, ethyloxylated and/or propoxylated glycerine di- or triallyl ether, pentaerythritol di-, tri- or tetraallyl ether, erythritol di-, tri- or tetraallyl ether, acrylated polyester oligomer, bisphenol A diacrylate, acrylated bisphenol A diglycidylether, ethyoxylated bisphenol A diallyl ether, and the like.

Examples of suitable polyallyl esters include diallyl maleate, diallyl fumarate, diallyl phthalate, diallyl terephthalate, diallyl succinate, di- or triallyl citrate and the like.

Other useful polyene compounds include triallyl cyanurate and triallyl isocyanurate (TAIC).

The cyclic peroxides are characterized as having at least one cyclic structure in which one or more peroxide (—O—O—) linkages form part of a ring. Among the suitable cyclic peroxides (component iii) are cyclic ketones and 1,2,4-trioxepanes as described, for example, in U.S. Pat. No. 8,334,348. The cyclic peroxide preferably has a half-life of 5 to 120 seconds, especially 10 to 60 seconds, at 210° C.

Among the useful cyclic ketones are those having any of the structures I-III:

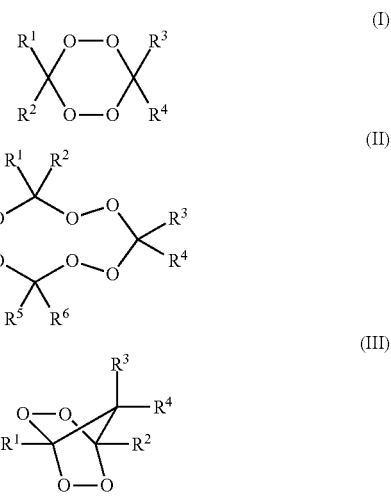

wherein each of $R^1$-$R^6$ are independently selected from the group consisting of hydrogen, $C_{1-20}$ alkyl, $C_{3-20}$ cycloalkyl, $C_{6-20}$ aryl, $C_{7-20}$ aralkyl and $C_{7-20}$ alkaryl, any of which may optionally be substituted with one or more groups selected from hydroxyl, alkoxy, linear or branched alkyl, aryloxy, ester, carboxy, nitrile and amido. The cyclic ketone peroxides preferably contain only carbon, hydrogen and oxygen atoms.

Suitable 1,2,4-trioxepanes (1,2,4-cycloheptanes) include those having the structure:

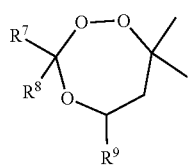

wherein $R^7$, $R^8$ and $R^9$ are independently hydrogen or hydrocarbyl that may be substituted with one or more groups selected from hydroxyl, alkoxy, linear or branched alkyl, aryloxy, ester, carboxy, nitrile and amido and provided that any two of $R^7$, $R^8$ and $R^9$ may together form a divalent moiety that forms a ring structure with the intervening atoms of the trioxepane ring.

In some embodiments, $R^7$ and $R^9$ each independently may be $C_{1-6}$ alkyl with methyl and ethyl being preferred. $R^8$ in some embodiments may be hydrogen, methyl, ethyl, isopropyl, isobutyl, t-butyl, amyl, iso-amyl, cyclohexyl, phenyl, $CH_3C(O)CH_2-$, $C_2H_5OC(O)CH_2-$, $HOC(CH_3)_2CH_2-$ or

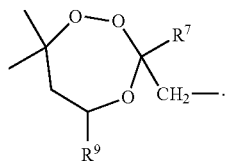

In other embodiments $R^7$ and $R^8$ together with the carbon atom to which they are bonded form a cyclohexane ring.

The cyclic peroxide may have a half-life of at most 5 minutes, preferably at most 2 minutes and more preferably at most 90 seconds at 210° C.

Specific cyclic peroxides include 3,6,9-triethyl-3,6,9-trimethyl-1,4,7-triperoxononane, which is available as Trigonox® 301 from Akzo Nobel; 3,3,5,7,7-pentamethyl-1,2,4-trioxepane, which is available as Trigonox® 311 from Akzo Nobel and 3-ethyl-3,5,7,7-tetramethyl-1,2,4-trioxepane which is available as MEK-TP from Akzo Nobel.

A branched polylactide composition is made by forming a molten mixture components i), ii) and iii) and reacting the molten mixture at a temperature sufficient to decompose component iii) and branch at least a portion of the linear polylactide resins.

The molten mixture contains melted linear polylactide resin(s) and melted (if not a liquid at room temperature) polyene compound. The temperature of the molten mixture is above both the crystalline melting temperature of polylactide and the melting temperature of the polyene compound. The polylactide melting temperature is generally the higher of these two.

The cyclic peroxide compound typically decomposes before melting. It is preferably dissolved in one or more of the other components of the molten mixture (i.e., into one or both of components i) and ii), and/or is dissolved in a solvent that is also a solvent for with the polylactide resin.

The order of mixing components i), ii) and iii) is not especially critical except that they should be mixed before or at the same time the cyclic peroxide compound is brought to a temperature at which it has a half-life of 5 minutes or less. Thus, for example, all three of components i), ii) and iii) can be mixed simultaneously, preferably while component i) is in the solid state. For example a dry blend of components i), ii) and iii) can be formed, which dry blend is then heated to form melt and perform the reaction.

Components i) and ii) instead can be mixed and optionally melted together before adding component iii). Alternatively, component iii) and all or a portion of component i) can be mixed first, with or without first melting the polylactide resins(s), and then combined with component ii) and any remaining amount of component i) and brought to the reaction temperature. For example, component iii) can be absorbed onto solid polylactide resin particles to form a concentrate (as described in U.S. Pat. No. 9,527,967) which is then added to component ii) and more component i) to form the molten mixture. It is also possible to first combine components ii) and iii) and then to blend the resulting combination with component i).

The amount of component ii) provided to the molten mixture is 0.05 to 1.5 weight percent, based on the weight of the linear polylactide resins. A preferred lower amount is 0.075 or 0.1 weight percent on the same basis, and a preferred upper amount is 0.5, 0.3 or 0.25 weight percent, again on the same basis.

The amount of component iii) provided to the molten mixture is 0.001 to 0.2 weight percent, based on the weight of the linear polylactide resins. A preferred lower amount is 0.01 or 0.02 weight percent on the same basis, and a preferred upper amount is 0.15, 0.1 or 0.075 weight percent, again on the same basis.

The molten mixture is reacted at a temperature sufficient to decompose component iii) and branch at least a portion of the linear polylactide resins. A suitable reaction temperature is at least 170° C., preferably at least 190° C. or at least 200°. The reaction temperature may be, for example, up to 260° C., but is preferably lower to reduce thermal degradation of the polylactide resin. An upper temperature of 235° C. or up to 225° C. is preferred. The reaction temperature may be a temperature at which the cyclic peroxide has a half-life of 5 to 120 seconds, preferably 10 to 60 seconds.

The time required to perform the reaction (i.e., the period of time during which the molten mixture is subjected to the reaction temperature) may be, for example, 15 to 60 minutes. In general the reaction time is at least equal to the half-life of the cyclic peroxide at the reaction temperature and may be at least 2 times or at least 3 times that half-life at the reaction temperature. A preferred reaction time is 1 to 10 minutes and a more preferred reaction time is 15 to 60 sec.

A convenient way of performing the branching reaction is to process the ingredients through an extruder. For example, the ingredients can be added together at the main inlet port, and heated together in the extruder to form the molten mixture, bring the molten mixture to the reaction temperature and maintain the molten mixture at the reaction temperature for the requisite time before the molten mixture is cooled by passing it through one or more cooling zones and/or removing it from the outlet end of the extruder.

The extrudate may be chilled such as by immersing it in cool water or other liquid and then chopped to form pellets that are useful in a subsequent melt-processing operation. In an integrated branching/melt processing operation, the extruder may feed downstream melt-processing apparatus directly or indirectly, in some cases without solidifying the extruded material.

The branched polylactide resin may be characterized by any one or more of the following parameters:

A) An absolute weight average weight ($M_w$) greater than that of the starting linear polylactide resin(s). The absolute $M_w$ of the branched polylactide resin may be, for example, at least 1.5 times, at least 1.8 times, at least 2 times, at least 2.5 times, at least 3 times or at least 3.5 times that of the starting polylactide resin(s). It some embodiments, it is up to 5 times that of the starting polylactide resin(s). All absolute molecular weights mentioned herein are measured by gel permeation chromatography/size exclusion chromatography using triple detection (light scattering, viscometer and refractive index detection).

B) An absolute $M_w$ of at least 150,000 g/mol. The absolute $M_w$ may be at least 200,000, at least 300,000, at least 350,000 or at least 400,000 g/mol.

C) A polydispersity (absolute $M_w$/absolute $M_n$) of at least 2.5. The polydispersity may be at least 2.7, at least 3.0, at least 3.3, at least 3.5, at least 3.8 or at least 4.0. In some embodiments the polydispersity is up to 6 or up to 5.

D) An absolute Z-average molecular weight ($M_z$) greater than that of the starting linear polylactide resin(s). The absolute $M_z$ of the branched polylactide resin may be, for example, at least 3 times, at least 5 times, at least 10 times or at least 15 times that of the starting polylactide resin(s), and may be up to, for example, 30 times or up to 25 times that of the starting polylactide resin(s).

E) An absolute $M_z$ of at least 1,000,000 g/mol. The absolute $M_z$ may be at least 1.25 million or at least 1.5 million g/mol and may be, for example, up to 5 million g/mol or up to 3 million g/mol.

F) An intrinsic viscosity between 0.8 and 1.25 times that of the starting polylactide resin(s). The intrinsic viscosity may be between 0.9 and 1.15 times that of the starting polylactide resin(s). Intrinsic viscosity may be measured by using size exclusion chromatography (SEC) coupled to a viscometer. SEC is operated using tetrahydrofuran (THF) as the mobile phase and is calibrated to known polystyrene standards. Polymer concentration is calculated using a dn/dc value of 0.046 for PLA in THF.

G) A intrinsic viscosity of 1.1 to 1.35 dL/g. The intrinsic viscosity may be 1.1 to 1.30 dL/g or 1.1 to 1.20 dL/g.

H) A branching number ($B_n$) of at least 3. The branching number may be at least 3.5, at least 4, at least 5, at least 6 or at least 7 and may be, for example, up to 12, up to 10 or up to 8. Branching number is measured using a method as described in the following examples.

I) A gel content of 15% or less by weight, based on the weight of the polylactide composition, as measured by size exclusion chromatography. The gel content may be 10% or less, 8% or less or 6% or less.

The branched polylactide composition exhibits an increased melt strength compared to the unbranched starting resin. Increased melt strength, for purposes of this invention, is indicated by one or both of a) an decreased tan delta value at a shear rate of 1/sec, measured as described in the following examples and b) an increased haul-off force, as determined at a haul-off speed of 5 meters/minute using a capillary rheometer as indicated in the following examples.

The branched polylactide may, for example exhibit a tan delta value of up to 5, up to 3, up to 2.5 or up to 2 at a shear rate of 1/sec. Very highly branched compositions may exhibit a haul-off force of at least 5, at least 10, at least 15 or at least 20 cN; haul-off forces of this magnitude are believed to be previously unknown for polylactide resins.

The branched polylactide compositions can be used directly (i.e., without being combined with one or more other resins) in a variety of melt-processing operations. These melt-processing operations include, for example, extrusion foaming; melt coating; melt fiber spinning; injection molding; blow molding, injection stretch blow molding; thermoforming; film coextrusion; blown film manufacture, and the like. The compositions are particularly beneficial in applications in which high melt strength and/or high drawability are needed. These include melt coating, film and sheet extrusion, extrusion foaming and deep draw thermoforming.

The branched polylactide compositions by themselves in many cases exhibit very high melt strengths, which may be in excess of what is needed for specific melt-processing operations. In addition, very highly branched compositions of the invention, such as those exhibiting $B_n$ values of 4 or greater, may exhibit somewhat reduced extensibility. This can limit their ability to be drawn at higher ratios during certain melt processing operations.

Accordingly, in some embodiments, the branched polylactide composition is let down with one or more additional polymers to form a blend that has properties which are particularly beneficial for specific melt processing operations. The branched polylactide composition may be let down by blending it, for example, with 0.25 to 199 parts by weight of additional resin per part by weight of branched polylactide composition. This ratio in some embodiments is 1 to 199, 3 to 99, or 4 to 49 parts by weight of additional resin(s) per part by weight of branched polylactide composition.

The additional resin may be, for example, another polylactide resin, another polyester, an acrylate or methacrylate polymer or copolymer, a polyolefin, a polyether, a polyamide, or other organic polymer. The additional resin preferably is thermoplastic and in the melt is compatible with the branched polylactide composition, i.e., does not phase segregate therefrom under quiescent conditions in the melt. A particularly preferred additional resin is a thermoplastic polylactide having a polydispersity ($M_w/M_n$) of less than 2.5 and a branching number of less 3.0.

The branched polylactide composition preferably is melt-blended with the additional resin, in cases in which the latter is present. The melting blending can be performed as part of a melt-processing operation, and/or as a separate manufacturing step to produce, for example, flakes or pellets of the melt-blended material. If desired, a dry blend of particles of the branched resin composition and particles of the additional resin can be formed and fed into melt processing apparatus to produce the melt blend.

The ability to form a very highly branched composition and let it down is a significant advantage. Smaller quantities of polylactide resin need to be subjected to the branching process. This allows smaller volumes of material to be processed under reaction conditions, thereby reducing production, allows for better control of temperature and residence time, and reduces the thermal degradation of the polylactide resin because a portion of that resin is removed from the thermal conditions of the branching process.

Unlike branched polylactides produced by some other processes (such as by extrusion reaction with epoxy-containing polymers) the polylactide compositions of this invention generally do not engage in further cross-linking or branching reactions when the compositions are melt-processed or let down (unless additional measures are taken to produce more branching). The amount of branching is set when the polylactide composition is produced, rather than during subsequent melt-processing or let-down. Therefore, it is not necessary for secondary fabricators to employ special process conditions or tight process controls as are needed in reactive extrusion processes in which branching takes place during the secondary fabrication. This leads to wider processing windows, easier processing generally, and a more consistent end product.

Still another advantage is that the let down step can be performed under less stringent conditions, in particular at lower shear, and thus can be performed using a wider variety of types of equipment, such as a single-screw extruder. The dilution step can be incorporated into a melt-processing operation for forming the branched polylactide composition into a downstream product.

The following examples are provided to illustrate the invention, but not to limit the scope thereof. All parts and percentages are by weight unless otherwise indicated.

The PLA resin is a linear poly(lactide) having a relative viscosity of 3.3 and in which ratio of L:D lactic units is about 96:4. It is commercially available from NatureWorks LLC as Ingeo® 3052D PLA resin. About 50% of the end groups of PLA A are carboxyl.

The Epoxy Branching Agent is an epoxy-group containing copolymer available commercially as Joncryl® ADR 4368C from BASF. It has an epoxy equivalent weight of about 285, a number average molecular weight of about 2500 g/mol and approximately 8.8 epoxide groups per molecule.

TAIC is triallyl isocyanurate.

PDA is pentane-1,5-diyl diacrylate.

TMPTA is trimethylolpropane triacrylate.

The Cyclic Peroxide Solution is a 3,6,9-triethyl-3,6,9-trimethyl-1,4,7-triperoxanone solution, which is available as Trigonox® 301 from Akzo Nobel. The concentration of active material in this product is 15-20% by weight. Its half-life at 210° C. is 12-62 seconds. The Cyclic Peroxide Solution is absorbed onto polylactide pellets at a concentration of 40% by weight of the Cyclic Peroxide Solution and 60% by weight of the polylactide.

EXAMPLE 1 and COMPARATIVE SAMPLES A and B

Example 1 is prepared by combining the PLA Resin with 0.21% (based on resin) of TAIC AND 0.25% (based on resin) of the Cyclic Peroxide Solution in a Brabender melt mixer operated at 60 rpm, 210° C. for 15 minutes.

Comparative Sample A is neat PLA Resin.

Comparative Sample B is prepared in the same general manner as Examples 1-3 from the PLA resin and the Epoxy Branching Agent.

The complex viscosity and tan delta G"/G' values are measured on Example 1 and Comparative Samples A and B, at a temperature of 210° C. and shear rates of 1 rad/s and 100 rad/s. Measurements are made using a TA Instruments ARES parallel plate rheometer equipped with TA orchestrator software. Plate diameter is 25 mm and the gap is 2 mm. Tool inertia is 62.5 g-cm$^2$ and strain is 1.6%. Results are as indicated in Table 1.

TABLE 1

| | Sample Designation | | |
|---|---|---|---|
| | A* | 1 | B* |
| 1 sec$^{-1}$ shear rate | | | |
| Complex Viscosity, Pa · s | 120 | 5000 | 60,000 |
| Tan Delta | 40 | 2 | 1 |
| 100 sec$^{-1}$ shear rate | | | |
| Complex Viscosity, Pa · s | 100 | 1000 | 30,000 |
| Tan Delta | 2 | 1.2 | 0.6 |

The results for Comparative Sample A represent a baseline. Neat linear PLA resin exhibits a low complex viscosity at both the low and the high shear rates. However, tan delta is quite high at low shear rates. Tan delta is a useful indicator of melt elasticity; high values are indicative of low melt strength. Comparative Sample A is representative of linear PLA resins in having low melt strength and low melt elasticity.

Example 1 shows the effects of this invention. At low shear rates, a viscosity increase is seen compared to Comparative Sample A, but due to the shear thinning behavior of these samples the viscosity at high shear is not significantly different than the baseline case. The small increase in viscosity is more than compensated for by the large increase in melt elasticity, as indicated by tan delta values of approximately 2 at low shear rate, compared to approximately 40 for the baseline case.

Comparative Sample B shows the effect of branching with the Epoxy Branching Agent. A large improvement in melt strength is seen relative to the baseline case, but the viscosity at low shear rate is an order of magnitude greater than Example 1.

EXAMPLES 2 and 3 and COMPARATIVE SAMPLE C

Examples 2 and 3 and Comparative Sample C are prepared by processing the starting materials listed below through a 30 mm twin screw extruder at a rate of 40 pounds (18.2 kg) per hour. Barrel temperatures are 215° C. The raw materials are dry blended and fed together through the throat. The extrudate is extruded into a water bath at 30-40° C. and chopped underwater to form pellets.

Example 2 is made using the PLA Resin, 0.2% (based on resin) of TAIC and 0.25% of the Cyclic Peroxide Solution (based on resin).

Example 3 is made using the PLA Resin, 0.2 wt.-% of TAIC and 0.1% of the Cyclic Peroxide Solution.

Comparative Sample C is neat PLA Resin.

Each of Examples 2 and 3 and Comparative Sample C are evaluated by gel permeation chromatography using a Viscotek GPCmax VE2001 GPC/SEC system (Malvern) equipped with a Viscotek TDA 302 triple detector array module (light scattering, viscometer, refractive index detectors). The mobile phase is THF (refractive index 1.405) at a rate of 1.0 mL/min and a temperature of 30° C. RI dn/dc is 0.185 for polystyrene standards and 0.046 for polylactide samples. Absolute $M_n$, absolute $M_w$, polydispersity, absolute $M_z$, inherent viscosity, branching number, and Mark-Houwink slope are all determined using OmniSEC version 4.7 software. For branching calculations, branching calculations are made using the "star" option. "MH exponent" is inputted as 0.68, "MH intercept" is inputted as −3.39, "structure factor" is inputted as 0.75 and "repeat factor" is inputted as 72,000. Results are as indicated in Table 2.

TABLE 2

| Designation | $M_n$, g/mol | $M_w$, g/mol | PDI | $M_z$, g/mol | IV (dL/g) | $B_n$ | Mark-Houwink slope (a) |
|---|---|---|---|---|---|---|---|
| C* | 59,000 | 109,000 | 1.8 | 154,000 | 1.136 | 2.00 | 0.7 |
| 2 | 97,000 | 409,000 | 4.2 | 2.5 MM | 1.190 | 7.48 | 0.42 |
| 3 | 75,500 | 205,000 | 2.8 | 1.6 MM | 1.129 | 3.78 | 0.50 |

The $B_n$ and Mark-Houwink slope values for Comparative Sample C are indicative of a linear polymer. The polydispersity (PDI) for that sample is typical for commercial grades of linear polylactide resins.

The large increases in polydispersity, $M_z$ and branching number and the large decrease in Mark-Houwink slope for Examples 2 and 3 demonstrate the effectiveness of the combination of TAIC and the cyclic peroxide as branching agents. A significant amount of branching is seen even at the lower level of cyclic peroxide (Ex. 3). The branching number of over 7 and Mark-Houwink slope of 0.42 for Example 2 are indicative of a hyperbranched structure. Gel contents are less than 6% (as indicated by % recovery of polymer introduced into the test apparatus) for each of Examples 2 and 3, despite the high degree of branching.

The haul-off force for each of Examples 2 and 3 and Comparative Sample C are measured at 225° C. using a Rosand capillary rheometer equipped with a haul-off system (Malvern Instruments). The capillary is 20 mm long and 2 mm in diameter. The piston is fixed as 10 mm/minute. Haul-off speed is varied from 5 meters/minute to 60 meters/minute. The average haul-off force over the haul-off speed range to 5 to 60 meters/minute is taken as the haul-off force for the sample. The haul-off force for Comparative Sample C is only about 0.5 centinewtons (cN) under those conditions.

By contrast, Example 3 exhibits a haul-off force of about 3.6 cN, representing a very large increase in melt strength. Example 2 exhibits a haul-off force of well over 20 cN, which is larger than that which can be achieved by branching with the Epoxy Branching Agent, despite the higher viscosity of the latter. In addition, Example 2 exhibits zero extensibility, which is consistent with very high elasticity.

The melt strengths of Example 3 and Example 2 in particular are higher than are needed for some applications, which allows for the possibility of diluting these samples with additional polylactide resin. A blend of PLA resin with as little as 5% (based on PLA resin) of Example 2 exhibits a significant increase in haul-off force, compared to Comparative Sample C. When the amount of Example 2 is increased to 20-40%, haul-off forces in the range of 0.75-3 cN are obtained. These represent substantial improvements that are adequate for many melt-processing operations. In addition, these blends have excellent melt extensibility, as indicated by their ability to be drawn at haul-off speeds of 100 to 250 meters/minute or more on this test.

EXAMPLE 4

A branched polylactide resin (Example 4) is produced in the same general manner as Examples 2 and 3, from the PLA resin, 0.23% TAIC and 0.25% of the Cyclic Peroxide Solution.

Let-down compositions containing 80% of the PLA resin and 20% of Example 4, and 90% of the PLA resin and 10% of Example 4 are prepared by melting blending the materials in a 30 mm twin-screw extruder.

Extruded sheet is produced from neat PLA Resin on a Leistritz 3 Roll Sheet line at a processing temperature of 225° C., a screw speed of 200 rpm and a throughput of 22.7 kg/hr. This temperature is somewhat higher than the optimal processing temperature for this grade, in order to reduce the melt viscosity. When the sheet is examined under polarized light, prominent stress bands are visible. These stress bands are indicative of poor processing due to uneven extrusion dimensions across the melt curtain and calendaring.

When the experiment is repeated by using the blend of 90% of the PLA Resin and 10% of Example 4, the stress bands are barely visible, indicating improved processing and better melt strength. When the experiment is again repeated using the blend of the 80% of the PLA Resin and 20% of Example 4, the stress bands virtually disappear.

What is claimed is:
1. A branched polylactide made by a method comprising the steps of
   I. forming a molten mixture of:
   i) a starting linear polylactide resin or mixture of linear polylactide resins;
   ii) 0.05 to 1.5 weight percent, based on the weight of component i), of at least one polyene compound, the polyene compound having 2 to 6 vinyl groups and an equivalent weight per vinyl group of up to 500; and
   iii) 0.001 to 0.2 weight percent, based on the weight of component i), of at least one cyclic peroxide; and
   II. reacting the molten mixture at a temperature sufficient to decompose component iii) and branch at least a portion of the linear polylactide resins, wherein the branched polylactide has an absolute $M_w$ of at least 200,000 g/mol, a polydispersity of at least 3, an absolute Z-average molecular weight of at least 1,250,000 g/mol, an inherent viscosity of 1.1 to 1.35 dL/g, a branching number ($B_n$) of at least 3, and a gel content of 10% or less by weight based on the weight of the polylactide composition.
2. A branched polylactide made by a method comprising the steps of
   I. forming a molten mixture of:
   i) a starting linear polylactide resin or mixture of linear polylactide resins;
   ii) 0.05 to 1.5 weight percent, based on the weight of component i), of at least one polyene compound, the polyene compound having 2 to 6 vinyl groups and an equivalent weight per vinyl group of up to 500; and
   iii) 0.001 to 0.2 weight percent, based on the weight of component i), of at least one cyclic peroxide; and
   II. reacting the molten mixture at a temperature sufficient to decompose component iii) and branch at least a portion of the linear polylactide resins, wherein the branched polylactide has an absolute $M_w$, of at least 350,000 g/mol, a polydispersity of at least 4, an absolute Z-average molecular weight of 1,500,000 to 3,000,000 g/mol, an inherent viscosity of 1.1 to 1.35 dL/g, a branching number ($B_n$) of at least 6, and a gel content of 10% or less by weight, based on the weight of the polylactide composition.

3. A branched polylactide having an absolute $M_w$, of at least 200,000 g/mol, a polydispersity of at least 3, an absolute Z-average molecular weight of at least 1,250,000 g/mol, an inherent viscosity of 1.1 to 1.35 dL/g, a branching number ($B_n$) of at least 3 branches, and a gel content of 10% or less by weight based on the weight of the polylactide composition.

4. A branched polylactide having an absolute $M_w$, of at least 350,000 g/mol, a polydispersity of at least 4, an absolute Z-average molecular weight of 1,500,000 to 3,000,000 g/mol, an inherent viscosity of 1.1 to 1.35 dL/g, a branching number ($B_n$) of at least 6 branches, and a gel content of 10% or less by weight based on the weight of the polylactide composition.

* * * * *